United States Patent
Rosen et al.

(10) Patent No.: US 9,470,234 B2
(45) Date of Patent: Oct. 18, 2016

(54) COMPRESSOR HOUSING BEARING AND SEAL

(75) Inventors: Seth E. Rosen, Middletown, CT (US); Brent J. Merritt, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 878 days.

(21) Appl. No.: 13/456,954

(22) Filed: Apr. 26, 2012

(65) Prior Publication Data
US 2013/0287555 A1 Oct. 31, 2013

(51) Int. Cl.
*F04D 29/056* (2006.01)
*F04D 29/10* (2006.01)
*F04D 17/12* (2006.01)
*F04D 29/12* (2006.01)
*F16C 33/74* (2006.01)
*F04D 29/051* (2006.01)

(52) U.S. Cl.
CPC ........... *F04D 17/122* (2013.01); *F04D 29/051* (2013.01); *F04D 29/056* (2013.01); *F04D 29/122* (2013.01); *F16C 33/74* (2013.01)

(58) Field of Classification Search
CPC ...... F04D 17/10; F04D 17/12; F04D 17/122; F04D 29/041; F04D 29/0413; F04D 29/046; F04D 29/047; F04D 29/0473; F04D 29/051; F04D 29/0513; F04D 29/056; F04D 29/057; F04D 29/059; F04D 29/102; F04D 29/122; F05B 2240/50; F05B 2240/53; F05B 2240/54; F05B 2240/57; F16J 15/32; F16J 15/3252; F16J 15/3268; F16J 15/3276; F16J 15/3464; F16J 15/3232; F16C 33/74

USPC .......... 415/111–113, 229–231; 277/635–637, 277/551

See application file for complete search history.

(56) References Cited

U.S. PATENT DOCUMENTS

| | | | |
|---|---|---|---|
| 1,310,682 A | | 7/1919 | Sherbondy |
| 4,171,936 A | * | 10/1979 | Hageman et al. ............ 417/407 |
| 5,113,670 A | | 5/1992 | McAuliffe et al. |
| 5,478,222 A | * | 12/1995 | Heidelberg ............... F04D 7/06 417/414 |
| 2006/0059942 A1 | * | 3/2006 | McAuliffe et al. ............. 62/402 |
| 2006/0059943 A1 | | 3/2006 | Merritt et al. |
| 2011/0192165 A1 | | 8/2011 | Rosen et al. |
| 2012/0156065 A1 | * | 6/2012 | Colson et al. ................ 417/405 |
| 2013/0078090 A1 | * | 3/2013 | Beers et al. .................. 415/230 |
| 2013/0101399 A1 | * | 4/2013 | Chrabascz et al. ........... 415/142 |

FOREIGN PATENT DOCUMENTS

CN 1928335 A 3/2007

OTHER PUBLICATIONS

Chinese First Office Action for Patent Application No. 201310144732.3 dated Apr. 24, 2015; 14 pages.

* cited by examiner

*Primary Examiner* — Christopher Verdier
(74) *Attorney, Agent, or Firm* — Cantor Colburn LLP

(57) ABSTRACT

A compressor housing for an air cycle machine includes an inlet and an outlet. The compressor housing additionally includes a plurality of ribs that extend generally perpendicularly from a surface of the compressor housing. Formed within an internal region of the compressor housing is a bearing support structure. The bearing support structure receives and limits the axial movement of a bearing, seal and at least one O-ring.

19 Claims, 6 Drawing Sheets

COMPRESSOR HOUSING BEARING AND SEAL

BACKGROUND OF THE INVENTION

Exemplary embodiments of this invention generally relate to aircraft environmental control systems and, more particularly, to an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to the aircraft cabin. ACMs commonly include at least two turbines and a compressor spaced axially at intervals on a common shaft. The turbines and compressor are supported for rotation about the axis of the shaft by one or more bearing assemblies.

On aircraft powered turbine engines, the air to be conditioned in the air cycle machine is typically compressed air bled from one or more of the compressor stages of the turbine engine. In conventional systems, this bleed air is passed through the air cycle machine compressor, where it is further compressed, then passed through a condensing heat exchanger to cool the compressed air. The heat exchanger sufficiently condenses moisture thereby dehumidifying the air. The dehumidified compressed air is then expanded in one of the turbines to extract energy from the compressed air so as to drive the shaft and also to cool the expanded turbine exhaust air as it is supplied to the cabin as conditioned cooling air.

BRIEF DESCRIPTION OF THE INVENTION

According to one embodiment of the invention, a compressor housing for rotation about a shaft is provided including an inlet and an outlet. The compressor housing additionally includes a plurality of ribs that extend generally perpendicularly from a surface of the compressor housing. Formed within an internal region of the compressor housing is a bearing support structure. The bearing support structure receives and limits the axial movement of a bearing, seal and at least one O-ring.

According to an alternate embodiment of the invention, an air cycle machine is provided including a compressor housing rotatable about a shaft. The compressor housing includes an inlet and on outlet. A plurality of ribs extend generally perpendicularly from a surface of the compressor housing. Formed within an internal portion of the compressor housing is a bearing support structure. The bearing support structure includes a bearing groove, and a first and second O-ring groove disposed on opposing sides of the bearing groove. The bearing support structure additionally includes a non-uniform surface for contacting and retaining the position of a seal. The surface includes a generally flat central portion and ends extending at an incline from the central portion.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
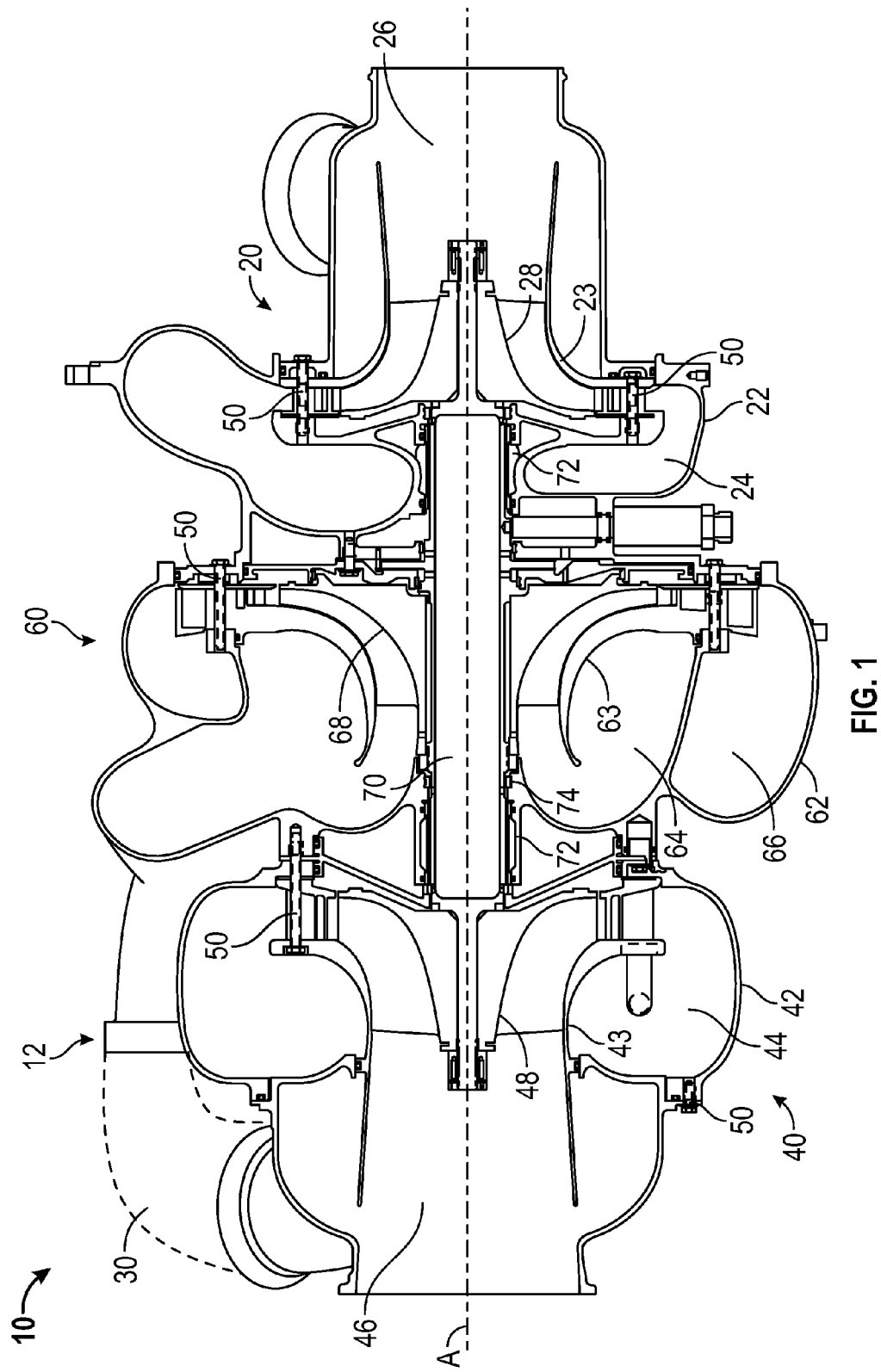
FIG. 1 is a cross-section of an air cycle machine (ACM) according to an embodiment of the invention.
Figure 2:
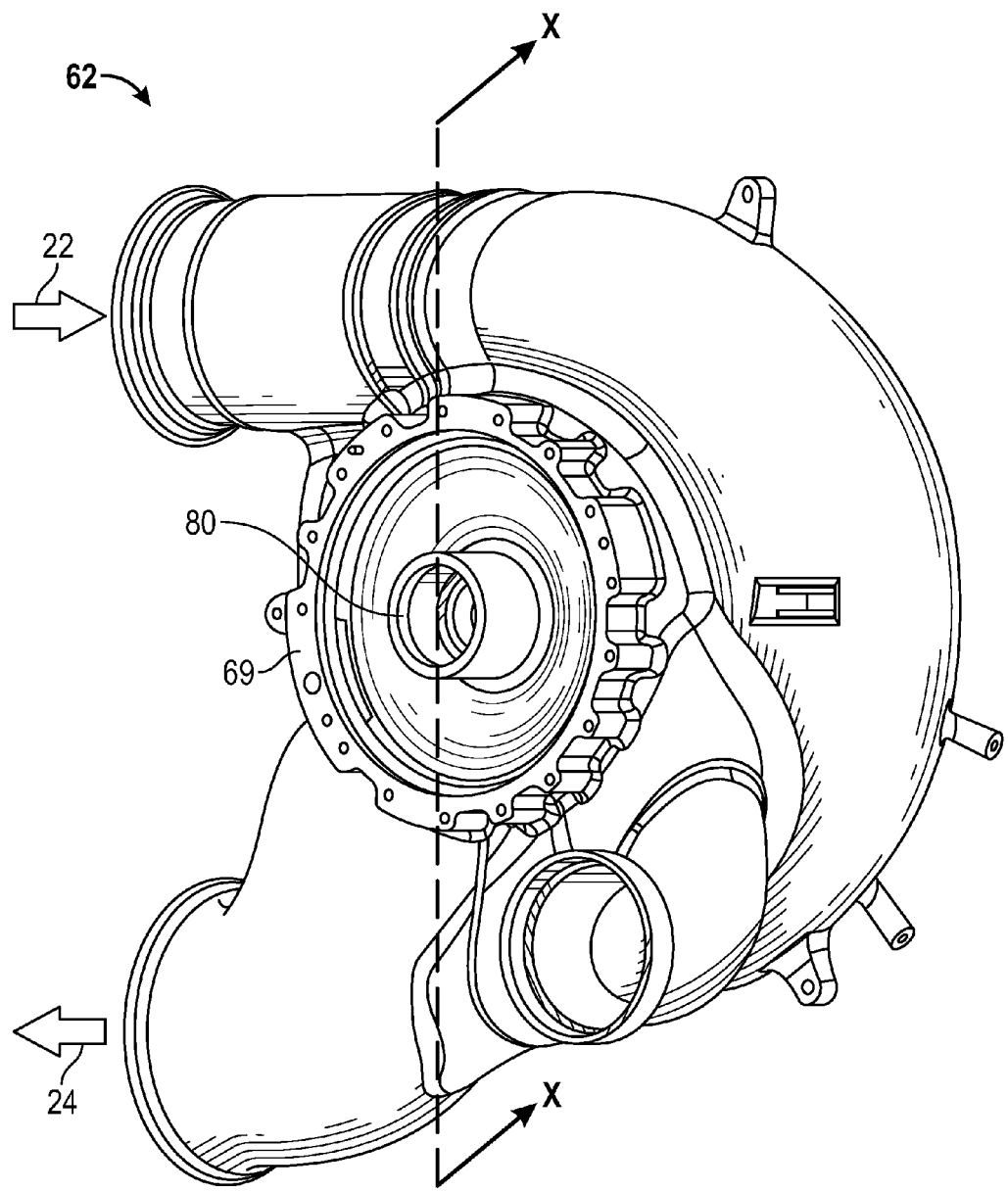
FIG. 2 is a perspective view of a compressor housing of an air cycle machine according to an embodiment of the invention.

Referring now to FIG. 1, an exemplary air cycle machine (ACM) 10 includes a first turbine 20, a second turbine 40, and a compressor 60. The ACM 10 includes a housing assembly 12 manufactured from multiple housing portions to provide a desired clearance for the compressor 60 and the turbines 20, 40. The ACM housing 12 includes a first turbine housing 22, a compressor housing 62, and a second turbine housing 42. The ACM housing 12 also includes first and second turbine shrouds 23 and 43, and a compressor shroud 63. The first turbine housing 22 and the second turbine housing 42 are connected to the centrally located compressor housing 62 with fasteners 50. In one embodiment, the fasteners 50 thread directly into the compressor housing 62.

The first turbine 20 has an inlet 24 and an outlet 26 and the second turbine 40 has an inlet 44 and an outlet 46. The compressor 60 also includes an inlet 64 and an outlet 66 and is driven by the first and second turbines 22 and 42. A bypass passage 30, illustrated with dotted lines, may be arranged between the compressor inlet 64 and the second turbine outlet 46 with a bypass valve (not shown) to regulate the fluid flow between them. The first turbine 20 includes a first turbine rotor 28, the second turbine 40 includes a second turbine rotor 48 and the compressor 60 includes a compressor rotor 68. The first and second turbine rotors 28, 48 and the compressor rotor 68 are coupled to a shaft 70 for rotation about an axis A. In one embodiment, the shaft 70 is hollow and is supported within the ACM housing 12 by bearings 72, such as hydrodynamic journal bearings for example. The shaft 70 may include a plurality of apertures (not shown) such that a cooling flow enters into the shaft 70 to cool the bearings 72. Seals 74 are positioned near the bearings 72 to direct cooling flow through the bearings 60 in a desired manner. The illustrated ACM 10 is exemplary and other configurations known to a person skilled in the art are within the scope of this invention.

Referring now to FIGS. 2-7, the compressor housing 62 is illustrated in more detail. In one embodiment, the compressor housing 62 is manufactured from a single piece of cast material. The portion of the compressor housing 62 that contacts the second turbine housing 42 includes a plurality of ribs 69 extending generally perpendicular from the surface of the compressor housing 62. Centrally located adjacent the plurality of ribs 69 is a bearing support structure 80 that similarly extends from the surface of the compressor housing 62 in the direction of the second turbine housing 42. The bearing support structure 80 engages and supports at least one of the bearings 72 and seals 74 coupled to the shaft 70.

Figure 3:
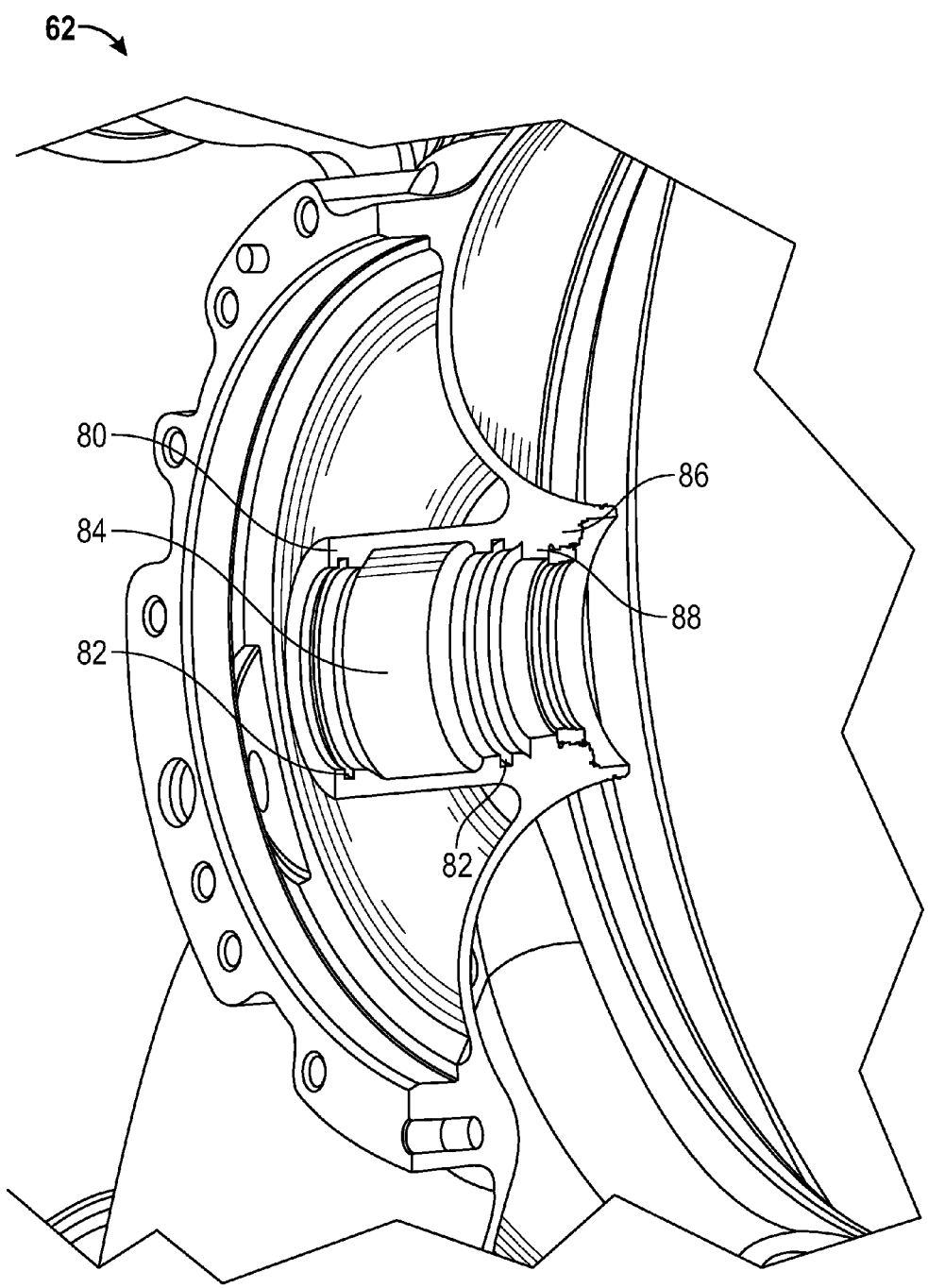
FIG. 3 is a perspective cross-sectional of the compressor housing of FIG. 2 taken at line X-X.
Figure 4:
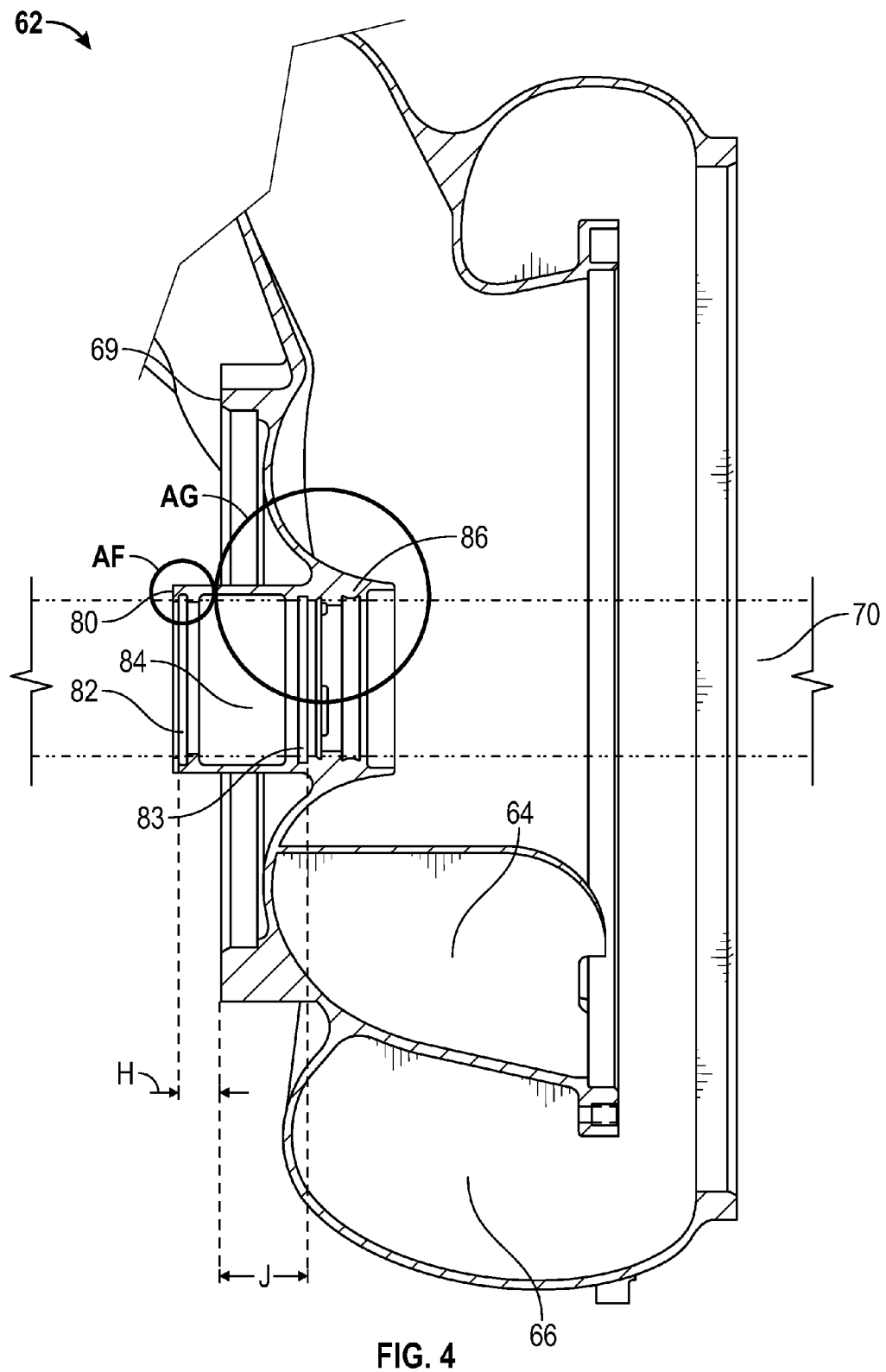
FIG. 4 is a cross-section of the compressor housing according to an embodiment of the invention.

Referring now to FIGS. 3 and 4, a perspective view partially in section and a cross-section of the bearing support structure 80 are illustrated. In FIG. 4, the shaft 70 has been included in dotted lines for clarity. In one embodiment, the bearing support structure 80 has a contoured surface with a plurality of grooves including a first O-ring groove 82 and a second O-ring groove 83, each for receiving an O-ring seal. The bearing support structure 80 may also include a bearing groove 84 for engagement with a bearing 72. In one embodiment, the O-ring grooves 82, 83 are located on opposite sides of the bearing groove 84. The bearing support structure 80 may additionally include a surface 86 for contacting a seal 74, such as a vespel seal for example. Adjacent the side of surface 86 closest to the second O-ring groove 83 is a protrusion 88 (see FIG. 3) that forms a wall generally perpendicular to surface 86. The protrusion 88 limits the axial movement of the seal 74 in the direction of the second turbine 40. Adjacent the opposite side of surface 86 is a radial step 90 (see FIG. 7). The radial step 90 protrudes beyond surface 86 to limit the axial movement of a seal 74 in the direction of the first turbine 20. The first and second O-ring grooves 82, 83 may be equally spaced from the center of bearing groove 84. In one embodiment, the edge of the O-ring groove 82 furthest from the bearing groove 84, is spaced a distance H of about 0.625 inches, 1.59 centimeters from the planar surface of the ribs 69. The edge of the second O-ring groove 83 furthest from the bearing groove 84, is spaced a distance J from the planar surface of the ribs 69. In one embodiment, distance J is about 1.275 inches, 3.24 centimeters.

Figure 5:
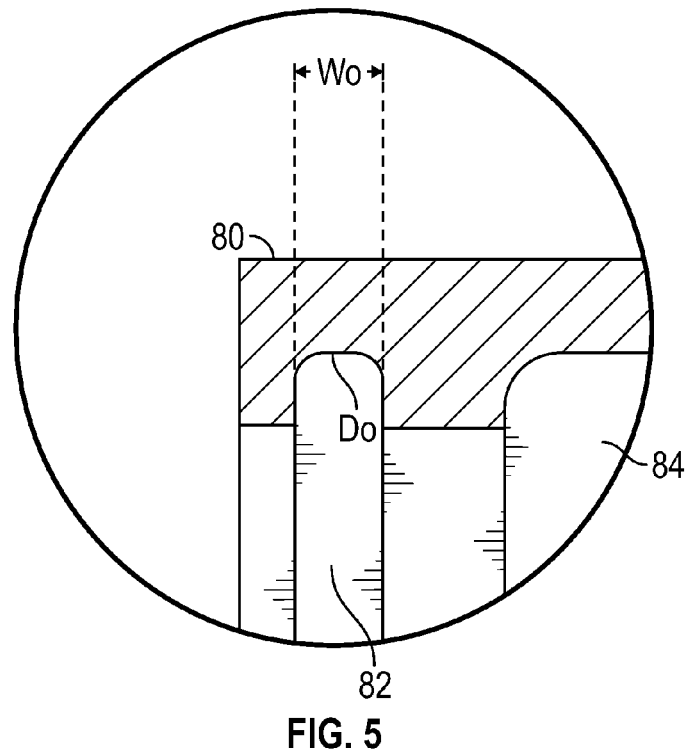
FIG. 5 is a detailed view of circle AF of FIG. 4.

FIG. 5 is an enlarged view of a portion of the bearing support structure 80. The first O-ring groove 82 has a diameter Do and an axial width Wo. In one embodiment, the diameter Do is about 2.424 inches, 6.16 centimeters and includes a tolerance of about ±0.002 inches, 0.005 centimeters. Similarly, the axial width Wo of first O-ring groove 82 may be about 0.134 inches, 0.340 centimeters with a tolerance of about ±0.005 inches, 0.013 centimeters. In one embodiment, the first O-ring groove 82 and the second O-ring groove 83 have an identical diameter Do and axial width Wo.

Figure 6:
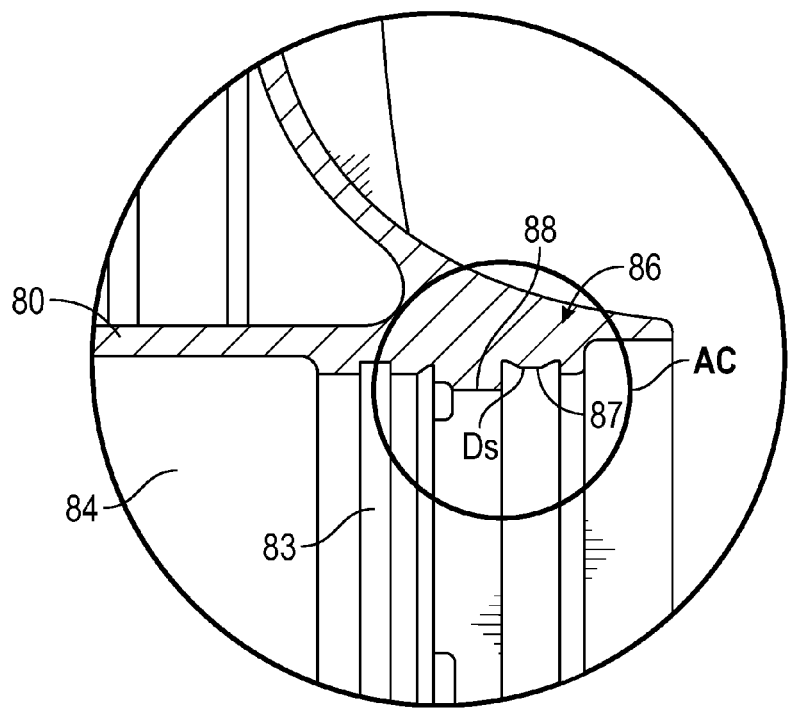
FIG. 6 is a detailed view of circle AG of FIG. 4.
Figure 7:
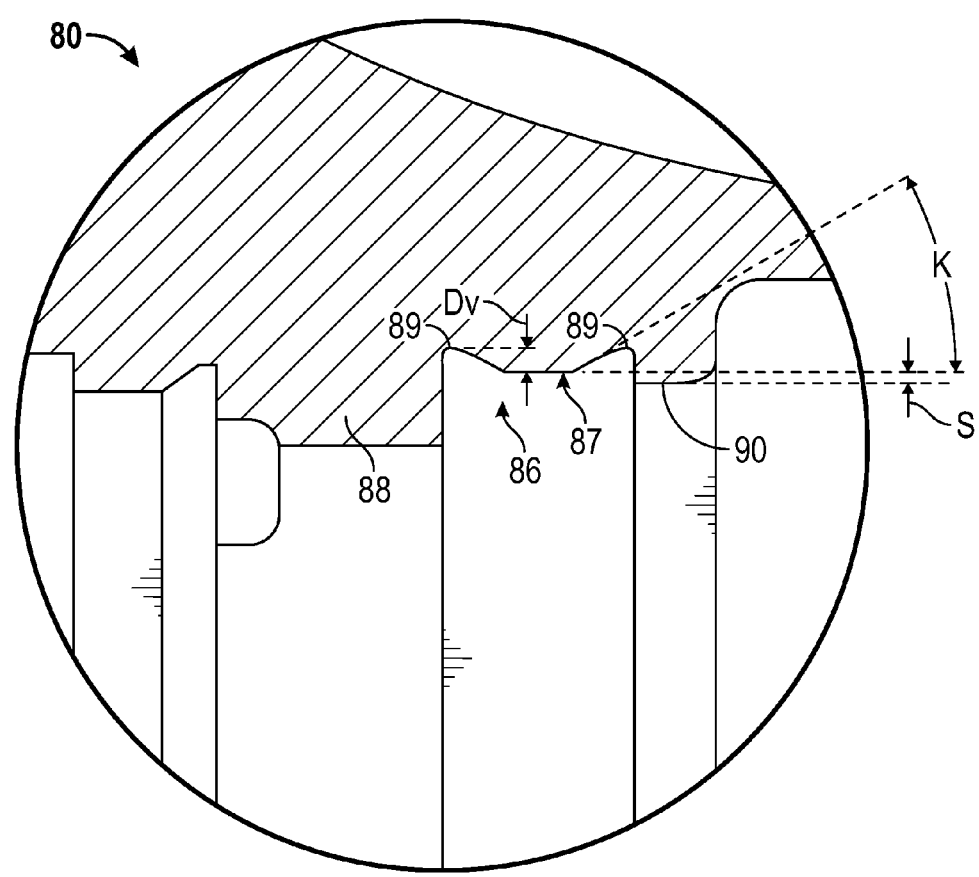
FIG. 7 is a detailed view of circle AC of FIG. 6.

Referring now to FIGS. 6 and 7, a detailed view of an alternate portion of the bearing support structure 80 is illustrated. Surface 86 that contacts a seal 74 is not uniform. The surface 86 may include a generally flat central portion 87 connected on each side to an inclined end 89. In one embodiment, the inner diameter Ds of the bearing support structure 80 at the central portion 87 of surface 86 is about 2.220 inches, 5.64 centimeters and includes a tolerance of about ±0.001 inches, 0.0025 centimeters. The diameter of the bearing support structure 80 at the central portion 87 of surface 86 is smaller than the diameter at the ends 89 of the surface 86 by a difference Dv. In one embodiment, the difference Dv is about 0.025 inches, 0.635 centimeters with a tolerance of about ±0.005 inches, 0.013 centimeters. Ends 89 extend at an incline from the central portion 87 of the surface 86 at an angle K. In one embodiment, K is about 30 degrees and has a tolerance of ±3 degrees. To limit the axial movement of a seal 74 in contact with surface 86, the radial step 90 extends beyond the central portion 87 of surface 86 by a distance S. In one embodiment, distance S that the radial step protrudes beyond the central portion of surface 86 is about 0.005 inches, 0.013 centimeters with a tolerance of about ±0.001 inches, 0.0025 centimeters.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A compressor housing for rotation about a shaft, comprising:
   an inlet;
   an outlet;
   a plurality of ribs extending generally perpendicularly from a surface of the housing; and
   a bearing support structure formed in an internal region of the compressor housing for receiving and limiting movement of a bearing, a seal, a first O-ring and a second O-ring, the first O-ring being arranged adjacent a first end of the bearing such that a first axial distance extends between the first O-ring and the first end of the bearing, the second O-ring being adjacent a second, opposite end of the bearing such that a second axial distance extends between the second O-ring and the second end of the of bearing, the seal being spaced from the second opposed end of the bearing such that the second O-ring is disposed between the seal and the second end of the bearing, the bearing support structure further including a surface for contacting the seal, wherein a protrusion located adjacent the surface is configured to limit movement of the seal in a first direction and a radial step located adjacent the surface is configured to limit movement of the seal in a second direction, the first O-ring and the second O-ring disposed non-coplanar with the bearing.

2. The compressor housing according to claim 1, wherein the bearing support structure includes a first O-ring groove and an edge of the first O-ring groove is a distance of about 0.625 inches, 1.59 centimeters from a planar surface of the plurality of ribs.

3. The compressor housing according to claim 2, wherein the bearing support structure includes a second O-ring groove and an edge of the second O-ring groove is a distance of about 1.275 inches, 3.24 centimeters from the planar surface of the plurality of ribs.

4. The compressor housing according to claim 3, wherein a diameter of the bearing support structure at the first O-ring groove is about 2.424 inches, 6.16 centimeters and has a tolerance of about ±0.002 inches, 0.005 centimeters.

5. The compressor housing according to claim 4, wherein an axial width of the first O-ring groove is about 0.134 inches, 0.340 centimeters and has a tolerance of about ±0.005 inches, 0.013 centimeters.

6. The compressor housing according to claim 5, wherein the diameter of the bearing support structure at the first O-ring groove is the same as the diameter of the bearing support structure at the second O-ring groove and the first O-ring groove and the second O-ring groove have the same axial width.

7. The compressor housing according to claim 1, wherein the surface is non-uniform and includes a generally flat central portion and ends extending at an incline from the central portion.

8. The compressor housing according to claim 7, wherein the diameter of the bearing support structure at the central portion of the surface is about 2.220 inches, 5.64 centimeters with a tolerance of about ±0.001 inches, 0.0025 centimeters.

9. The compressor housing according to claim 8, wherein the diameter of the bearing support structure at the central portion of the surface is smaller than the diameter of the bearing support structure at the ends of the surface by a difference of about 0.025 inches, 0.0635 centimeters with a tolerance of about ±0.005 inches, 0.013 centimeters.

10. The compressor housing according to claim 7, wherein the ends of the surface extend from the central portion at an incline of about 30 degrees with a tolerance of about ±3 degrees.

11. The compressor housing according to claim 7, wherein the radial step protrudes a distance of about 0.005 inches, 0.0127 centimeters with a tolerance of about ±0.001 inches, 0.0025 centimeters beyond the central portion of the surface.

12. An air cycle machine comprising:
a compressor housing rotatable about a shaft including:
an inlet;
an outlet;
a plurality of ribs extending generally perpendicularly from a surface of the housing; and
a bearing support structure wherein the bearing structure includes:
a bearing groove;
a first O-ring groove, the first O-ring groove being arranged adjacent a first end of the bearing groove such that a first axial distance extends between the first O-ring groove and the first end of the bearing groove and a second O-ring groove, the second O-ring groove being arranged adjacent a second end of the bearing groove such that a second axial distance extends between the second O-ring groove and the second end of the bearing groove, the first O-ring groove and the second O-ring groove disposed non-coplanar with the bearing groove; and
a non-uniform surface for contacting and retaining a seal, the surface including a generally flat central portion and ends extending at an incline from the central portion, the seal being axially spaced from the second end of the bearing such that the second O-ring groove is positioned between the seal and the second end of the bearing groove; and
a radial step located adjacent the seal, the radial step being configured to limit movement of the seal in a first direction.

13. The air cycle machine according to claim 12, wherein an edge of the first O-ring groove is a distance of about 0.625 inches, 1.59 centimeters from a planar surface of the plurality of ribs and an edge of the second O-ring groove is a distance of about 1.275 inches, 3.24 centimeters from the planar surface of the plurality of ribs.

14. The air cycle machine according to claim 12, wherein a diameter of the bearing support structure at the first O-ring groove is about 2.424 inches, 6.16 centimeters with a tolerance of about ±0.002 inches, 0.005 centimeters and an axial width of the first O-ring groove is about 0.134 inches, 0.340 centimeters and has a tolerance of about ±0.005 inches, 0.0130 centimeters.

15. The air cycle machine according to claim 12, wherein the diameter of the bearing support structure at the first O-ring groove is the same as the diameter of the bearing support structure at the second O-ring groove and the first O-ring groove and the second O-ring groove have the same axial width.

16. The air cycle machine according to claim 12, wherein the diameter of the bearing support structure at the central portion of the surface is about 2.220 inches, 5.64 centimeters with a tolerance of about ±0.001 inches, 0.0025 centimeters.

17. The air cycle machine according to claim 12, wherein the diameter of the bearing support structure at the central portion of the surface is smaller than the diameter of the bearing support structure at the ends of the surface by a difference of about 0.025 inches, 0.0635 centimeters with a tolerance of about ±0.005 inches, 0.0127 centimeters.

18. The air cycle machine according to claim 12, wherein the ends of the surface extend from the central portion at an incline of about 30 degrees with a tolerance of about ±3 degrees.

19. The air cycle machine according to claim 12, wherein a radial step is located adjacent the surface and protrudes a distance of about 0.005 inches, 0.0127 centimeters with a tolerance of about ±0.001 inches, 0.0025 centimeters beyond the central portion of the surface.

* * * * *